J. R. ADAMS.
Sash-Holders.
No. 134,186.　　　　　　　　　　　　Patented Dec. 24, 1872.
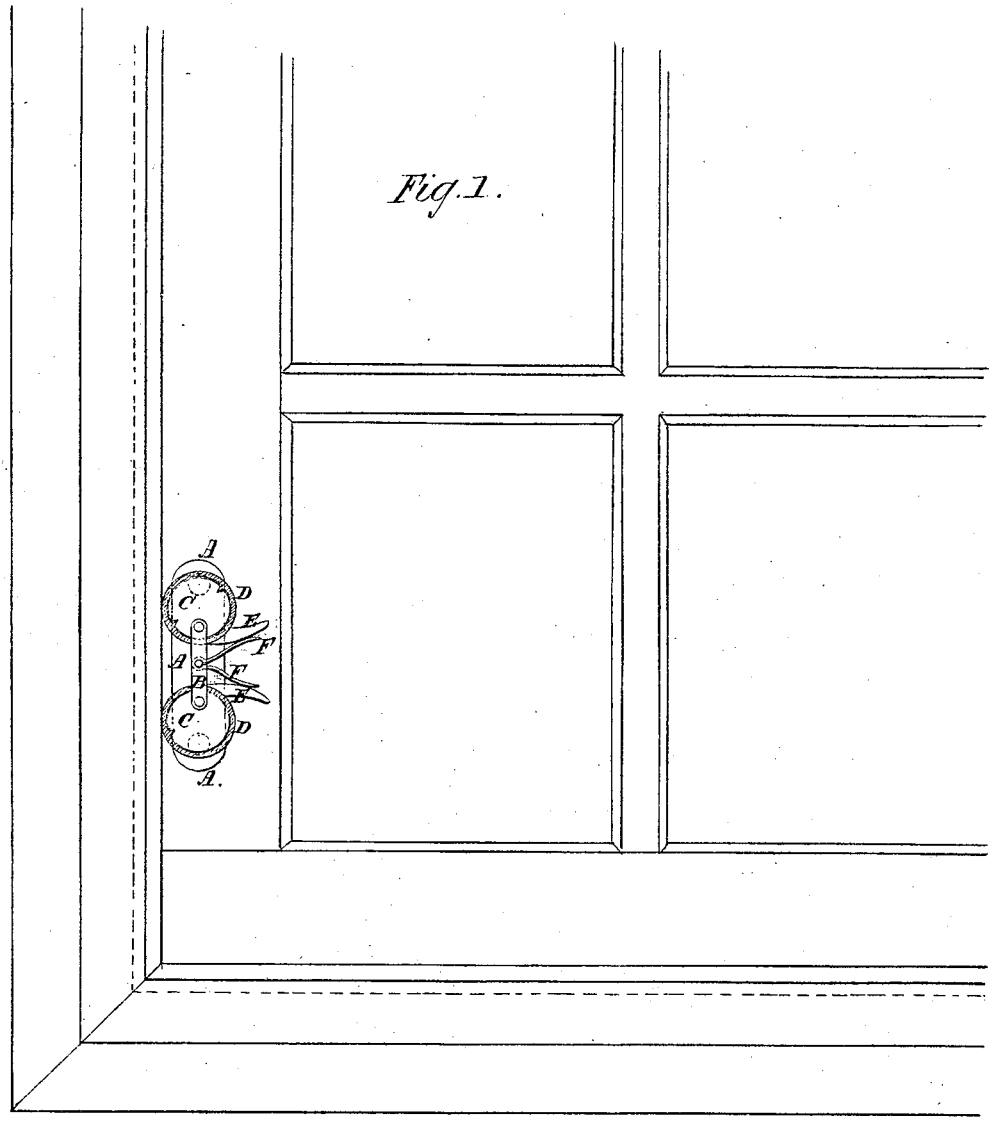
Fig. 1.
Fig. 2.
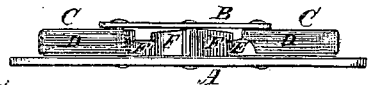
Witnesses:
John Becker
Geo. W. Mabee
Inventor:
J. R. Adams
Per
Attorneys.

UNITED STATES PATENT OFFICE.

JOHN R. ADAMS, OF WEST GALWAY, ASSIGNOR TO HIMSELF AND FRANK F. CARNDUFF, OF AMSTERDAM, NEW YORK.

IMPROVEMENT IN SASH-HOLDERS.

Specification forming part of Letters Patent No. 134,186, dated December 24, 1872.

*To all whom it may concern:*

Be it known that I, JOHN R. ADAMS, of West Galway, in the county of Fulton and State of New York, have invented a new and useful Improvement in Window-Sash Fastener, of which the following is a specification:

Figure 1 represents my improved fastener as applied to a window. Fig. 2 is an edge view of the same.

Similar letters of reference indicate corresponding parts.

My invention is an improvement in the class of sash-holders consisting essentially of two cam-faced levers acted on by an intermediately-arranged spring; and consists in the construction and arrangement of parts, as hereinafter described, and specifically indicated in the claim.

A is a plate, which is secured to the side bar of the window-sash. B is a smaller plate, which is connected with the plate A by three rivets or screws, one at the center and one at each end of the plate B. C are two eccentric wheels, which are pivoted to and between the plates A B by the two end rivets or screws that connect the said plates. The wheels C are faced with rubber or other elastic bands D, and are notched transversely across their faces in one or more places to receive a rib of the rubber bands C, and thus prevent said rubber bands from slipping upon the said wheels. Upon the rims of the wheels C, near their shortest radius, is formed a thumb-piece, E, as shown in Figs. 1 and 2. F is a forked spring, which is pivoted to the central rivet or screw that connects the plates A B to each other, and the ends or forks of which rest and press against adjacent sides of the arms or thumb-pieces E with sufficient force to hold the faces of the wheels C against the casing of the window.

By this construction any attempt to raise the window-sash from any position in which it may be will cause the upper wheel to be pressed against the casing with a pressure increasing with a force proportioned to the force applied to the window-sash. In the same way any attempt to lower the window will cause the lower wheel C to hug the casing. The spring F holds both wheels in a position to operate if there is any attempt to move the sash. By pressing the thumb-pieces or arms E toward each other, the wheels C will both be turned so as to present their shortest radius toward the casing, allowing the sash to be moved up or down freely. The rubber D causes a sharp quick action of the fastener, and prevents the fastener from marring or injuring the wood-work or paint of the window-casing.

Having thus described my invention, I claim as new and desire to secure by Letters Patent—

The improved sash-holder formed of the two circular rubber-encircled wheels, C C, pivoted eccentrically between the plates A and B, and provided with the tangential arms E acted on by the V-shaped spring F, likewise pivoted between the said wheels, all as shown and described.

JOHN R. ADAMS.

Witnesses:
F. F. CARNDUFF,
ALBERT F. VEDDER.